United States Patent [19]

Matthews

[11] 4,066,995

[45] Jan. 3, 1978

[54] ACOUSTIC ISOLATION FOR A TELEMETRY SYSTEM ON A DRILL STRING

[75] Inventor: Hugh B. Matthews, Acton, Mass.

[73] Assignee: Sperry Rand Corporation, New York, N.Y.

[21] Appl. No.: 648,074

[22] Filed: Jan. 12, 1975

[51] Int. Cl.[2] .............................................. G01V 1/40

[52] U.S. Cl. ................................ 340/18 LD; 175/56; 175/320; 267/125; 267/137; 340/18 NC; 340/18 R

[58] Field of Search .......... 340/18 NC, 18 LD, 18 R; 175/56, 320, 65, 207; 285/48, 49; 267/125, 137

[56] References Cited

U.S. PATENT DOCUMENTS

| | | | |
|---|---|---|---|
| 2,810,546 | 10/1957 | Eaton et al. | 340/18 NC |
| 3,263,446 | 8/1966 | Wiggins, Jr. | 175/320 |
| 3,309,656 | 3/1967 | Godbey | 340/18 R |
| 3,422,912 | 1/1969 | Camp | 175/65 |
| 3,588,804 | 6/1971 | Fort | 340/18 NC |
| 3,606,392 | 9/1971 | Garrett | 285/49 |
| 3,732,728 | 5/1973 | Fitzpatrick | 340/18 NC |
| 3,746,330 | 7/1973 | Taciuk | 267/137 |
| 3,779,040 | 12/1973 | Garrett | 285/49 |
| 3,790,930 | 2/1974 | Lamel et al. | 340/18 LD |
| 3,947,009 | 3/1976 | Nelmark | 267/137 |

OTHER PUBLICATIONS

"High Pressure Drilling and Blowout Prevention," Bell, *Oil and Gas Journal,* 10/14/57, pp. 138–165, Spec. p. 138.

*Primary Examiner*—Howard A. Birmiel
*Attorney, Agent, or Firm*—Howard P. Terry

[57] ABSTRACT

A system for the transmission of data along a borehole during drilling operations which includes an acoustic transmitter receiver and mechanical filters. Data is acoustically propagated from the transmitter to the receiver along a portion of the drill string which is isolated from noise generating elements of the drilling system by means of the mechanical filters.

3 Claims, 2 Drawing Figures

ACOUSTIC ISOLATION FOR A TELEMETRY SYSTEM ON A DRILL STRING

BACKGROUND OF THE INVENTION

1. Field of the Invention

This invention relates generally to the art of transmitting information along a well bore drill string or other pipe. More particularly, the invention relates to a means for isolating the section of the drill string, employed for information transmission, from acoustic noise generated by the drilling process.

2. Description of the Prior Art

Many systems have been developed for acoustically telemetering information from the bottom of a borehole without interrupting the drilling operation. These systems utilize shear, compressional, and torsional waves along the drill string as the acoustic information carrier and all must extract an acoustic signal from acoustic noise generated by the drilling process. This noise includes: noise generated by equipment on the drilling platform and transmitted into the drill string through connections to the kelly; noise generated in the drilling mud and coupled into the drill string; noise generated by the drilling bit and transmitted into the drill string through the coupling between the drilling bit and the drill string; and noise generated by the drill string contacts with the side of the borehole. These noise sources generate a noise spectrum containing both discrete noise frequency, as that generated by the rotating drill, and random impulse noise giving rise to a continuous spectrum which may be generated by the impacting of the drill string against the side of the borehole. Most of this noise is concentrated at relatively low frequencies with a roll-off of the noise amplitude as the frequency increases. It is the intent of this invention to utilize the frequency spectrum above the concentrated noise for communications from between down-hole and the surface.

SUMMARY OF THE INVENTION

The present invention provides an acoustic communications system, which includes an acoustic transmitter and receiver, wherein the higher frequency components of the acoustic noise generated by the drilling process are essentially prevented from being coupled to the acoustic receiver and to the drill string, which is the acoustic propagation medium, by means of mechanical filters which are located near the drill bit and the drilling platform. The mechanical filters have a mass-compliance-mass configuration to provide a low pass frequency response to mechanical vibrations. Damping, to eliminate resonances, is provided by the inclusion of damping elements and by the mud contained in the borehole and the mud passage that extends through the filter. Additional high frequency filtering is provided by the insertion of a high frequency pulsation damper in the mud line. This high frequency filtering allows for the acoustic transmission of data along the drill string, within the filtered acoustic band, with significantly improved signal-to-noise ratios.

DESCRIPTION OF THE PREFERRED EMBODIMENT

Figure 1:
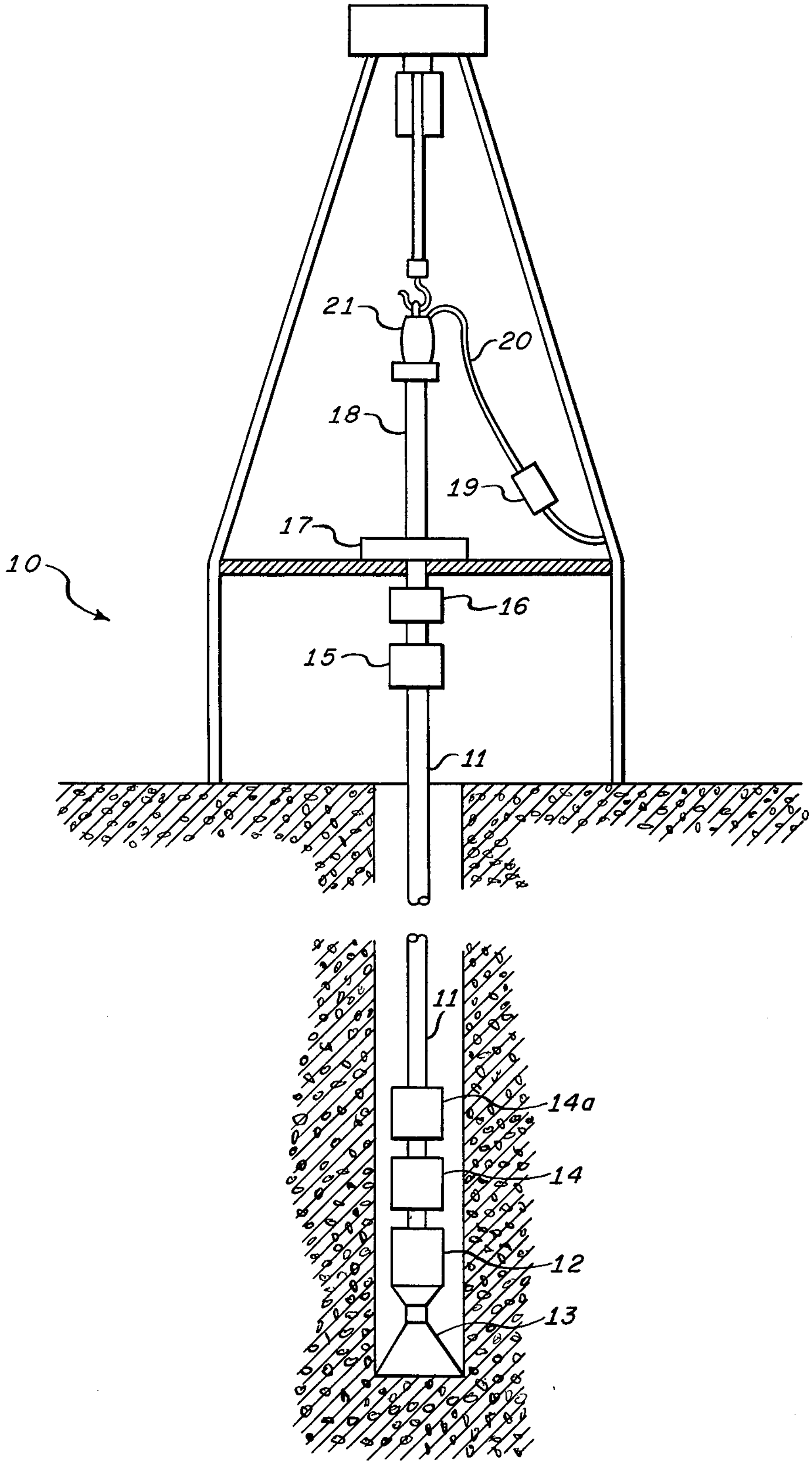
FIG. 1 is an illustration of a drilling apparatus employing a drill string communication system according to the invention.

Referring to FIG. 1, the principal components of a communication system 10 in accordance with the invention includes: the drill string 11, along which the acoustic wave propagates; an isolation sub 12, which is a mechanical filter for the attenuation of vibrations along the drill string 11 caused by the operation of the drill bit 13; an instrumentation sub 14 which contains sensors, processing circuitry; an acoustic transmitter **14*a*; a receiving sub 15 for the reception of acoustic waves; a second isolation sub 16 which is a mechanical filter for the attenuation of high frequency vibrations due to the rotation of the rotating table 17 and various other equipment on the drilling platform and rig, and the kelly 18; and a pulsation damper or pump filter 19, which may be inserted in the mud line 20 between the swivel 21** and the mud pump (not shown), for reducing noise caused by the drilling fluid pump.

During drilling operations, mechanical vibrations on the drill string that generate acoustic noise within the pass band of the receiver 15 that are caused by the operation of the drill bit 13 and which are coupled to the drill string 11 through isolation sub 12, are attenuated by the filtering action of the isolation sub 12. Down-hole data is gathered by the sensors contained in the instrumentation sub 14 and used to modulate an acoustic transmitter **14*a*. The acoustic transmitter 14*a* is coupled to the drill string 11 thereby, exciting an acoustic wave which propagates towards the surface along the drill string 11 and is received by receiving sub 15. The second isolation sub 16, which is located on the drill string between the receiving sub 15 and the turntable 17 and kelly 18, attenuates the acoustic noise within the passband of the receiver 15 which may enter the receiver 15 due to noise generated by the turntable 17 and the kelly 18, thus, preserving the signal-to-noise ratio at the receiver 15. Acoustic noise within the passband of the receiver 15, that may enter the system as a result of the mud pulsations in the borehole and through the drill string, are attenuated by the pulsation damper 19**.

Figure 2:
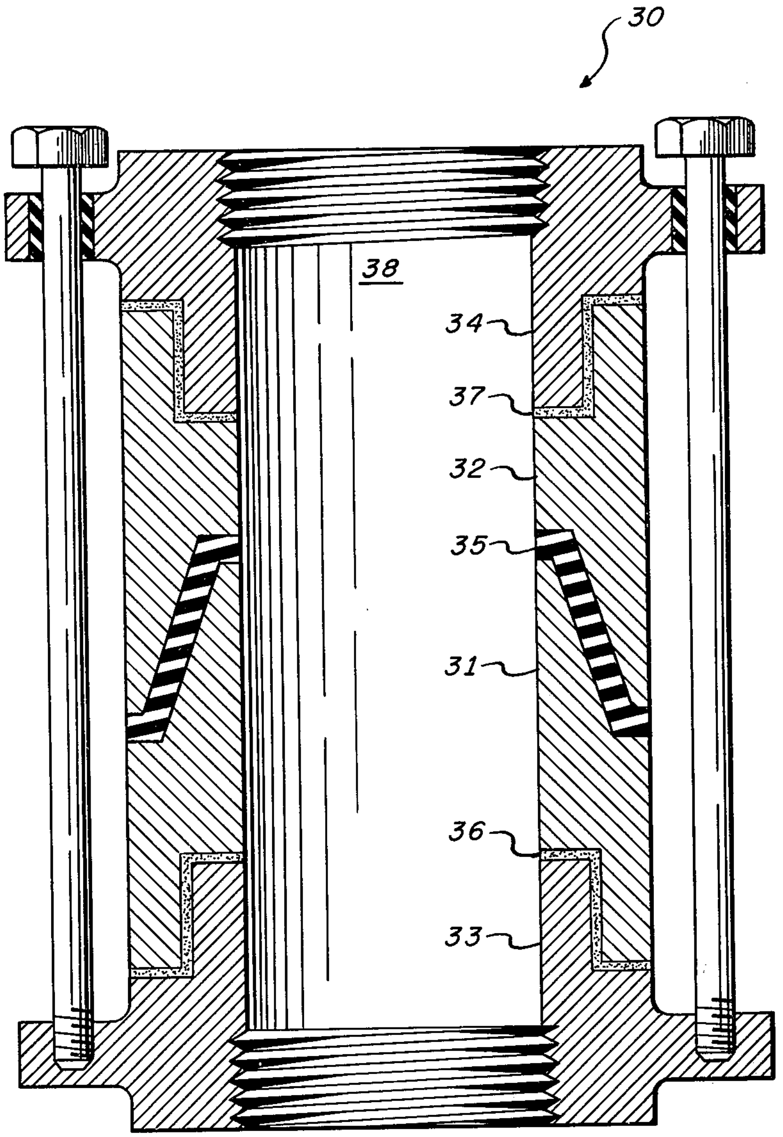
FIG. 2 is a cross-sectional view of a mechanical low-pass filter which may be employed as an isolation sub in the system.

Refer now to FIG. 2. There is illustrated an isolation sub 30 that provides lowpass mechanical vibration filtering for transversal, longitudinal and torsional waves. The filter includes a first mass section 31, a second mass section 32, a first connection section 33, and a second connection section 34, all of which may be constructed of steel or other appropriate materials. A compliance element 35, which may be constructed of rubber or other compliant material and in cross-section appears as a squared-off elongated S, couples the mass sections 31 and 32, adhering thereto by vulcanization or some other appropriate means. The first connection section 33 is coupled to the first mass section 31 by a first damping element 36 and the second connection section 34 is coupled to the second mass section by a second damping element 37. The isolation subs 12 and 16 may be of this configuration and may be inserted into the system by coupling the connection sections 33 and 34 between sections of the drill string 11.

As a result of the drilling operation compressional forces are exerted on the drill string which gives rise to longitudinal mechanical vibrations that generate acoustic waves along the drill string. These vibrations propagate along the drill string to the mechanical vibration filter 30, whereat they couple to the connection section 33. The vibrations of connection section 33 are coupled to the mass section 31 through the damping element 36, which may be some type of frictional coupling between the mass section 31 and the connection section 33, thence from mass section 31 through the compliance element 35 to mass element 32 and to the second connection section through the second damping element 37, which may also be some type of frictional coupling. During the time interval of the vibration in which a force is exerted from the first connection section 33 towards the first mass section 31, mass section 31 moves a distance towards mass section 32 causing compliance element 35 to compress, and transmitting a force to the second mass section 32 which is a function of this compression. For low vibrating frequencies the movement through the two mass sections 31 and 32 is essentially complete, prior to the change in the force direction, thus transmitting a force to the second connection section 34 that is only slightly reduced as a result of the frictional couplings 36 and 37 and the compliance element 35. At the higher vibrating frequencies, mass section 31 moves a much shorter distance prior to the change of the force direction, causing a much shorter compression of the compliance element 35 and little if any movement of the second mass section 32, thus transmitting a much reduced force to the second connection section 34. Damping elements 36 and 37, as well as the damping which results from the mud in the borehole and in the mud passage 38, dissipate some of the mechanical energy of the vibrating system, adding to the reduction of the transmitted force and preventing any vibrational resonances that may occur. Though the operation of the mechanical filter has been explained in terms of longitudinal vibrations, it should be obvious to those skilled in the art that the configuration of FIG. 2 will operate in a similar manner as above-described when subjected to transversal and torsional vibrations.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A system for the transmission of acoustic signals representative of down hole drilling parameters encountered during operation of a drilling apparatus that includes a rotating table, a drill string coupled thereto, and a drill bit, driven through said drill string, wherein said acoustic signals are caused to propagate along said drill string on which acoustic noise exists that extends over an acoustic frequency spectrum having a lower acoustic frequency band and an upper acoustic frequency band, said system comprising:

an acoustic receiver coupled to said drill string to receive signals in an acoustic frequency passband within said upper acoustic frequency band of said acoustic noise frequency spectrum;

an acoustic transmitter coupled to said drill string at a predetermined distance from said acoustic receiver for transmitting an acoustic signal within said acoustic frequency passband of said receiver;

instrumentation means coupled to said acoustic transmitter for modulating said transmitted acoustic signal, said modulation representative of said downhole drilling parameters;

a first lowpass acoustic filter coupled between said instrumentation means and said drill bit comprising a first mass section, a second mass section, a compliance element, shaped in cross-section as an elongated S, circumferentially therebetween, and first and second coupling sections for coupling said first and second mass sections between sections of said drill string, said first and second coupling sections circumferentially coupled respectively to said first and second mass sections via first and second damping elements both having longitudinal and transverse sections, whereby noise generated during the drilling operation at acoustic frequencies within said passband of said receiver are attenuated for longitudinal, transverse and torsional modes; and a second lowpass acoustic filter coupled between said acoustic receiver and said rotating platform comprising a first mass section, a second mass section, a compliance element, shaped in cross-section as an elongated S, circumferentially therebetween, and first and second coupling sections for coupling said first and second mass sections between sections of said drill string, said first and second coupling sections circumferentially coupled respectively to said first and second mass sections via first and second damping elements both having longitudinal and transverse sections, whereby noise at acoustic frequencies within said passband of said receiver, generated by the rotation of said platform and the operation of equipment thereabove are attenuated for longitudinal, transverse and torsional acoustic modes.

2. An acoustic transmission system in accordance with claim 1 wherein said drill bit is cooled by a liquid pumped thereto through a conduit, further including a third lowpass acoustic filter coupled to said conduit whereby, acoustic noise at acoustic frequencies within said passband of said receiver, caused by liquid pulsations within said conduit, are attenuated.

3. A system for the transmission of acoustic signals in accordance with claim 1 wherein said drill bit is cooled by a liquid pumped thereto through a conduit, further including a second low pass acoustic filter coupled to said conduit whereby, acoustic noise at acoustic frequencies within said passband of said receiver, caused by liquid pulsations within said conduit, are attenuated.

* * * * *